April 5, 1938.  J. E. HALE  2,113,527

TIRE CONSTRUCTION

Filed Dec. 28, 1937  2 Sheets-Sheet 1

INVENTOR
James E. Hale
BY Albert L. Ely
ATTORNEY

April 5, 1938.   J. E. HALE   2,113,527
TIRE CONSTRUCTION
Filed Dec. 28, 1937    2 Sheets-Sheet 2
Fig. 4.
Fig. 5.
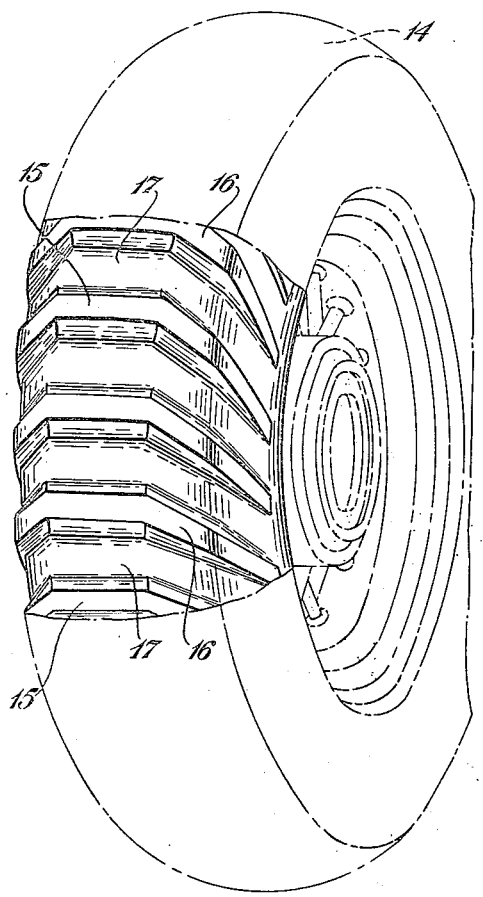
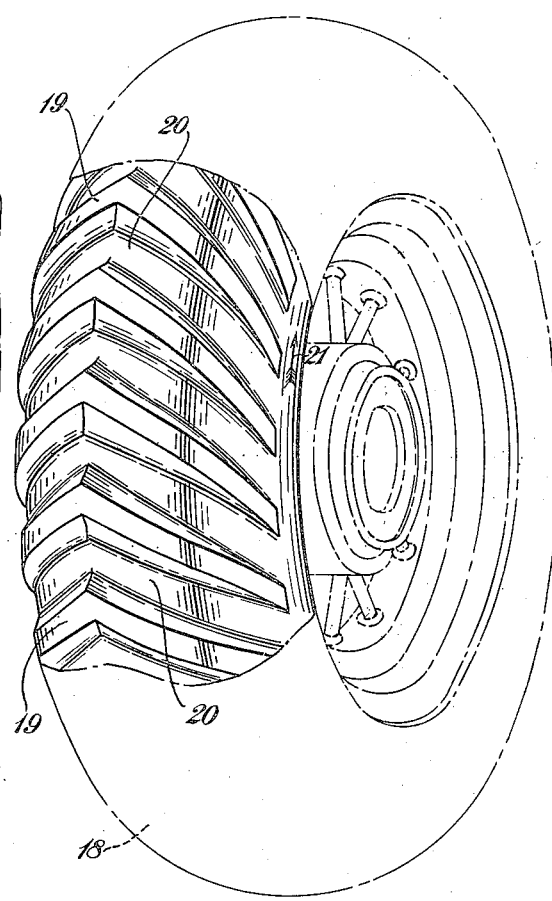
INVENTOR
James E. Hale
BY
Albert L. Ely
ATTORNEY Patented Apr. 5, 1938

2,113,527

UNITED STATES PATENT OFFICE 2,113,527

TIRE CONSTRUCTION

James E. Hale, Akron, Ohio, assignor to The Firestone Tire & Rubber Company, Akron, Ohio, a corporation of Ohio Application December 28, 1937, Serial No. 182,113

6 Claims. (Cl. 152—14)

This invention relates to tire constructions and more especially it relates to the design or configuration of the tread portion of a tire adapted for heavy traction service, such as pneumatic tires for tractors, road-graders and the like.

When tractors were first used for agricultural and other purposes, metal rims with lugs applied thereto were devised to assure traction and to prevent slipping of the wheels with respect to an earth medium. It was found that a single type of lug did not operate satisfactorily in the various kinds of earth conditions encountered in use and, therefore, it was necessary to design special lugs for particular soil conditions. As a result, a great many types of tractor lugs were designed and used, but heretofore there has been no design of a tractor lug or a tire tread which would inherently provide a self-cleaning action to eject or prevent packing of dirt between the lugs or traction elements. It was common for the lugs on rigid steel tractor wheels to become so tightly packed with earth or snow as to substantially nullify the normal action of the lugs.

The above conditions also existed in tractors equipped with prior pneumatic tires, inasmuch as the tread was not designed to facilitate discharge of the material accumulated between the traction elements of the tire tread. The present invention solves the problem of providing a tire for use on agricultural and other vehicles which will continuously effect a discharge of materials from the tread to avoid clogging and thereby increase the traction efficiency of the tire.

Heretofore, it was also the objective and aim in designing metal lugs for tractor wheels, and even treads for pneumatic tires, to provide traction elements or treads which would, as nearly as possible, positively eliminate slip between the periphery of the wheel and the surface on which it was running. In these prior devices the design was based on the most favorable soil traction conditions. Such conditions of operation prevail only during a very small proportion of the actual operation of the tractor.

Under practical farming conditions, often a field may be in proper condition for cultivation, except for very small wet and muddy areas. Also, it may be necessary to pass through soft, muddy areas in going to and from fields. Even though it may be desirable to cultivate or work the field, it may be impractical, due to the fact that the tractor and implements cannot get through these soft areas. It it highly desirable that sufficient traction be available in order that the tractor may be operated through the wet areas. The added shearing resistance developed in the muddy soil by the present tire, because of the tendency toward lateral discharge, greatly facilitates traction through such areas with reduced disturbance of the sub-soil of the wet area.

Whereas it was the objective of prior tractor lugs and pneumatic tire treads for use on tractors and the like, to provide a tread which would have equal traction forward and backward, the present tire design has sacrificed to some extent the rearward traction in order to provide one which will have a greater forward traction coupled with a self-cleaning action while traveling forward.

A major object of the invention therefore is to provide a resilient tire tread having a tread configuration that affords improved traction in a deformable or compactible medium, such as snow, sod, cover crop or slippery mud or earth.

Another object is to provide an improved tire tread in which self-cleaning of the tread is facilitated by the normal tendency of the tire to slip under tractive effort.

Another object is to provide an improved tire tread in which tread bars are so shaped, arranged, and their relative height and spacing are so proportioned that the weight distribution over the portions of the tread facilitates self-cleaning and at the same time increases the shear resistance of the deformable or compactible traction medium upon which the tire is operating.

Another object is to provide an improved tire tread in which the tread bars are so shaped and arranged that under slight slippage due to tractive effort, the tendency toward lateral discharge of slippery or compactible medium increases the shearing resistance at the lateral marginal portions of the tread.

Another object is to devise an improved tire tread in which the height, width, and spacing of traction bars and their converging relationship with each other are such that the tire is capable of exerting maximum tractive effort in a deformable or compactible medium.

This application is a continuation in part of my co-pending application, Serial No. 37,030, filed August 20, 1935.

Of the accompanying drawings:

Figures 4 and 5 are perspective views of modifications of the invention.

Figure 1:
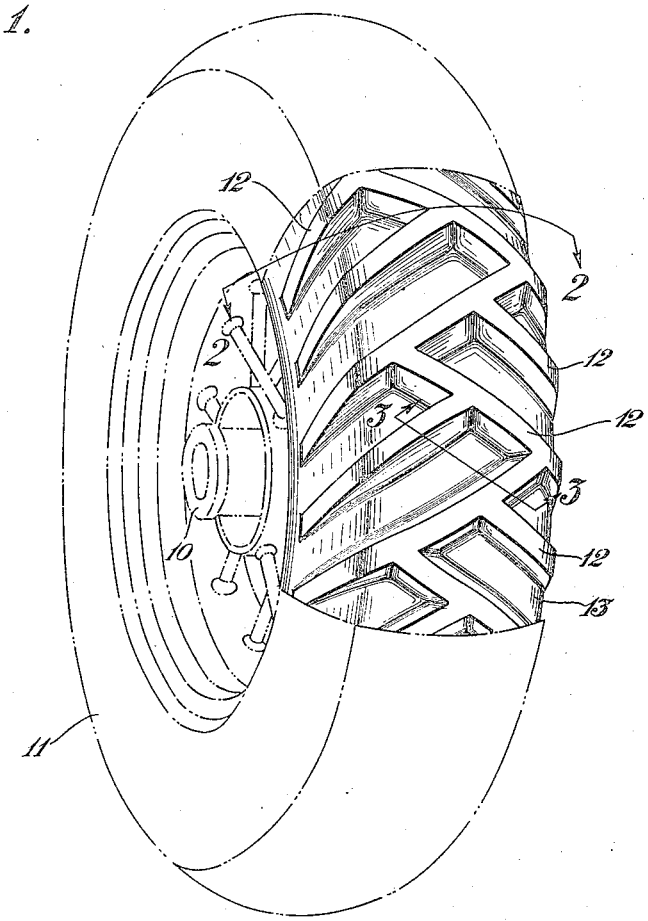
Figure 1 is a perspective of a vehicle wheel, and a pneumatic tire thereon constituting one embodiment of the invention.
Figure 2:
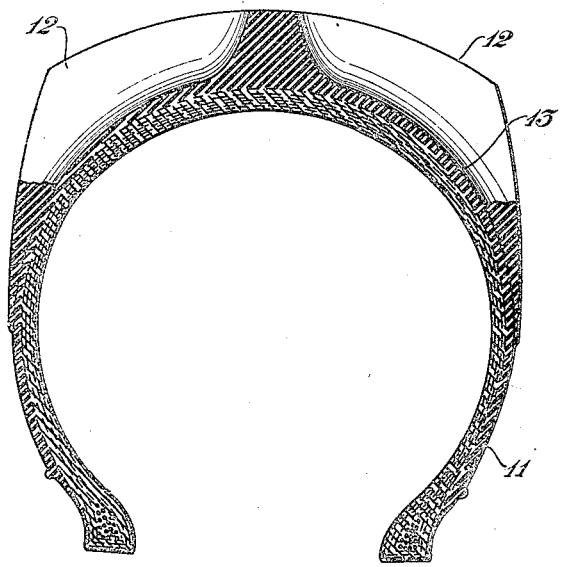
Figure 2 is a section of the tire on the line 2—2 of Figure 1.
Figure 3:
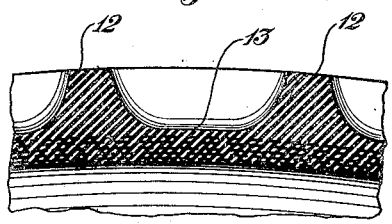
Figure 3 is an enlarged scale section of the tire on the line 3—3 of Figure 1.

Referring to the drawings, 10 is a wheel of any known or preferred construction, and 11 is a pneumatic tire mounted thereon. The tire has a tread portion formed with obliquely disposed parallel ribs or bars 12, 12 that lie in opposite directions on opposite sides of the center line of the tire tread and have their outer ends disposed at the sides of the tire. The ribs 12 on each side of the tire are of two different lengths and are disposed in alternation. The arrangement is such that a long and a short rib on one side of the tire intersect a long rib from the other side of the tire intermediate the ends of said last mentioned rib. There are no exposed points or rib-ends in the medial portion of the tread to become rapidly worn down by "wiping" action upon the roadway. The ribs or bars 12 define intervening recesses or grooves 13, 13, and the latter are wider than said ribs. The bars are preferably tapered and joined to the tread with a fillet, as shown in Figure 3. The sides of the bars may be straight or curved; it being understood that the shape may be such that the bars are individually stable. The shape shown reduces flex-cracking of the rubber and also facilitates cleaning. Also, the taper reduces the "spading" and increases the downward thrust component of the tractive effort.

Applicant has found that there is a definite relationship between the spacing of the ribs or bars 12 and the self-cleaning and traction characteristics of the tire, and that said characteristics are materially improved or enhanced when the said ribs or bars are spaced relatively farther apart than heretofore has been common practice. To this end the recesses or grooves 13 of applicant's tire are made wider than the intervening bars or ribs 12, as is most clearly shown in Figure 3. Proper tread bar height with respect to the spacing of the tread bars is essential in order to enable the bars to penetrate the earth medium upon which they are operating, to afford proper traction. If the bars are too close together, most of the weight is carried on the peripheral surface thereof and, therefore, in a loose earth medium there will not be sufficient shear resistance afforded between the bars. By increasing the width of the grooves between the bars, more and more of the weight is carried on the tire between the bars to increase the shear resistance. In order that the shearing resistance will not be readily overcome, the relative height of the bars has been increased in the present construction.

The height of the bars 12 is at least as great as the transverse dimension thereof. This feature combined with the fact that the grooves 13 are unobstructed and of a width substantially greater than the transverse dimension of the bars, results in a tire tread capable of exerting increased tractive effort by facilitating penetration of the bars into an underlying deformable or compactible medium such as snow, sod, cover crop, loose earth or slippery mud medium, and by aiding the discharge of any soft material accumulated in the grooves by slight slippage of the bars relative to such medium.

The present invention contemplates a flexible tire tread purposely designed so that the normal tendency to slip automatically facilitates the cleaning action. This cleaning action serves to increase traction, first, because it allows the bars 12 to properly engage the earth medium, and secondly, because the lateral discharge against the sides of the impression or "trench" of the tire in the earth medium under the slight slippage increases the shearing resistance at the lateral marginal portions of the tread and makes it possible to deliver greater drawbar pull.

The tire is so mounted upon the wheel that the bars converge in a common direction opposite to that in which tractive effort is desired. The relative height and spacing of the bars is such that the cleaning action is facilitated consistent with increased traction due to novel proportioning of the weight distribution over the bars and the intervening grooves.

As the improved tire rolls and contacts the surface over which it is being operated, the lower side of the tire, due to the weight of the vehicle, will tend to flatten slightly and in so doing will cause the bars of the tread to penetrate the surface and to exert a squeezing force upon the displaced material which enters the grooves between the bars, and that as the vehicle moves forward and the previously flattened portion resumes its normal shape, the bars will tend to move apart and release any material which may have been held therein by adhesion. In the event that snow, or a clod of earth in the form of damp soil, clay or mud, etc., remains in the grooves, the same will be laterally discharged when that portion of the tire next contacts the surface over which it is operating due to the slight slippage of the tire relatively to said surface and to the further fact that the action of any additional material entering the grooves tends to eject laterally the material already accumulated therein.

In the embodiment of the invention shown in Figure 4, the tread portion of the tire 14 is formed with a circumferential series of bars having transversely extending medial portions 15, 15 and lateral portions 16, 16 disposed obliquely to the medial portions thereof and intervening recesses or grooves 17, 17 between said bars.

In the embodiment of the invention shown in Figure 5, the tire 18 is shown with a tread structure comprising parallel bars or ribs 19, 19 that are obliquely disposed with relation to the center line of the tread and extend to the sides of the tire, the ribs on one side of the center line of the tread being disposed at an angle to those on the other side thereof, and intersecting them in a manner to form a circumferential series of chevrons or V-shaped characters. There are similarly shaped recesses or grooves 20, 20 between adjacent ribs or bars 19.

The design described has been found to be self-cleaning when the tire is so mounted upon a vehicle that the points of the chevrons point rearwardly when in contact with the ground. An arrow 21 may be placed on the side of the tire to indicate the proper direction of rotation when the tire is employed to tractive effort. It will be understood that the tire will be mounted in a reverse direction when used solely for braking purposes as on the front wheels of a rear-wheel-drive vehicle. Similar means may be employed on the other embodiments of the invention if desired, to indicate the proper direction of turning.

Each embodiment described comprises the characteristic feature of the invention; namely, that the height of the ribs or bars is at least as great as their width, that the spaces between the tread ribs or bars are substantially wider than the ribs or bars themselves, and that at least portions of the ribs or bars converge in a direction opposite to that in which maximum tractive effort is desired. It will be understood that wherever in the specification and claims I have referred to the transverse dimension of the bars 12 or to the width of the recesses of grooves 13, I intend that these dimensions be taken at the tread or peripheral portion of the tire.

Other modification may be resorted to without departing from the spirit of the invention or the scope of the appended claims.

What is claimed is:

1. A self-cleaning resilient tire having sides and a tread, said tread comprising a plurality of series of bars, the bars of each series being substantially parallel and spaced from each other circumferentially by grooves with the bars of one series extending toward the bars of the other series so that said bars converge toward each other in a direction opposite to that in which a tractive effort is normally desired, the height of said bars being at least as great as the transverse dimension of said bars, said grooves being unobstructed and of a width substantially greater than the transverse dimension of said bars to increase tractive effort by facilitating penetration of said bars into an underlying deformable or compactible medium, and by aiding the discharge of any soft material accumulated in said grooves by slight slippage of said bars relative to said medium.

2. A self-cleaning pneumatic tire having sides and a flexible tread, said tread comprising a series of circumferentially spaced sets of ribs extending obliquely from said sides toward the center line of said tire, and converging toward each other in a direction opposite to that in which a tractive effort is normally desired, each of said sets comprising a plurality of substantially parallel ribs spaced from each other by unobstructed grooves and at least one of the ribs of each of said sets extending across the center line of said tire, the height of said bars being at least as great as the transverse dimension of said bars, said grooves being of a width substantially greater than the transverse dimension of said ribs to increase tractive effort by facilitating penetration of said bars into an underlying deformable or compactible medium, and by aiding the discharge of any soft material accumulated in said grooves by slight slippage of said bars relative to said medium.

3. A self-cleaning tire for motor vehicles having a flexible tread comprising a plurality of parallel bars having portions diverging outwardly from the center line of the tire, the height of said bars being at least as great as the transverse dimension of said bars, said bars being circumferentially spaced by unobstructed grooves of a width substantially greater than the transverse dimension of said bars to increase tractive effort by facilitating penetration of said bars into an underlying deformable or compactible medium, and by aiding the discharge of any soft material accumulated in said grooves by slight slippage of said bars relative to said medium.

4. A self-cleaning tire for motor vehicles having a flexible tread comprising a plurality of bars having portions diverging outwardly relatively to the center line of the tire, said bars having points of juncture lying substantially on said center line, said bars being circumferentially spaced by unobstructed grooves of a width substantially greater than the transverse dimension of said bars, the height of said bars being at least as great as the transverse dimension of said bars to increase tractive effort by facilitating penetration of said bars into an underlying deformable or compactible medium, and by aiding the discharge of any soft material accumulated in said grooves by slight slippage of said bars relative to said medium.

5. A self-cleaning resilient tractor tire having a tread comprising a plurality of series of bars, the bars of each series being substantially parallel and spaced from each other circumferentially by grooves with the bars of one series extending toward the bars of the other series so that said bars converge toward each other in a direction opposite to that in which a tractive effort is normally desired, the height of said bars being not less than the transverse dimension of said bars, said grooves being unobstructed and of a width substantially greater than the transverse dimension of said bars to increase tractive effort by facilitating penetration of said bars into the earth.

6. A self-cleaning tractor pneumatic tire having a flexible tread comprising a plurality of parallel bars having portions diverging outwardly from the center line of the tire, the height of said bars being not less than the transverse dimension of said bars, said bars being circumferentially spaced by grooves of a width substantially greater than the transverse dimension of said bars to increase tractive effort by facilitating penetration of said bars into the earth.

JAMES E. HALE.